United States Patent [19]

Hegedus et al.

[11] Patent Number: 5,124,385
[45] Date of Patent: Jun. 23, 1992

[54] POLYURETHANE SELF-PRIMING TOPCOATS

[75] Inventors: Charles R. Hegedus, Warrington, Pa.; Donald J. Hirst, Mt. Laurel, N.J.; Anthony T. Eng, Philadelphia, Pa.

[73] Assignee: The United States of America as represented by the Secretary of the Navy, Washington, D.C.

[21] Appl. No.: 701,406

[22] Filed: May 13, 1991

Related U.S. Application Data

[63] Continuation-in-part of Ser. No. 442,085, Nov. 28, 1989, Pat. No. 5,043,373, which is a continuation-in-part of Ser. No. 331,200, Mar. 28, 1989, Pat. No. 4,885,324, which is a continuation of Ser. No. 211,026, Jun. 16, 1988, abandoned.

[51] Int. Cl.⁵ .............................................. C08L 75/04
[52] U.S. Cl. .................................... 524/204; 524/396; 524/417; 524/443
[58] Field of Search ................ 524/204, 396, 417, 443

[56] References Cited

U.S. PATENT DOCUMENTS 4,885,324 12/1989 Hegedus et al. .................. 524/204
5,043,373 8/1991 Hegedus et al. .................. 524/204

Primary Examiner—Maurice J. Welsh
Attorney, Agent, or Firm—James V. Tura; James B. Bechtel; Susan E. Verona

[57] ABSTRACT

A corrosion-resistant coating which can be applied directly to a surface as a self-priming topcoat comprising from about 10 to 90 percent by weight of a polymeric polyurethane binder and 5 to 65 percent by weight of a combination of metal salts or pigments which consist essentially of calcium borosilicate, zinc salts of benzoic acids, and an alkaline earth metal phosphate such as zinc-barium phosphate. In addition, the coating may contain up to about 30 percent by weight of a titanium dioxide pigment and up to about 75 percent by weight of at least one organic solvent.

16 Claims, No Drawings

POLYURETHANE SELF-PRIMING TOPCOATS

STATEMENT OF GOVERNMENT INTEREST

The invention described herein may be manufactured and used by or for the Government of the United States of America for governmental purposes without the payment of any royalties thereon or therefor.

CONTINUATION APPLICATIONS

This application is a continuation-in-part of copending application Ser. No. 07/442,085 filed Nov. 28, 1989 now U.S. Pat. No. 5,043,373, which in turn is a continuation-in-part of Ser. No. 07/331,200 filed Mar. 28, 1989 now U.S. Pat. No. 4,885,324 which in turn is a continuation of copending application Ser. No. 07/211,026 filed Jun. 16, 1988, now abandoned.

BACKGROUND OF THE INVENTION

This invention relates to novel coating compositions and more specifically to corrosion-resisting coatings which can be applied directly to various surfaces particularly metal either as a high or low gloss, self-priming topcoat.

Various surfaces and particularly metal substrates require the protection of a coating especially when the surfaces are exposed to a corrosive environment. Metal surfaces of aircraft, for example, are exposed to seawater spray which require protection from corrosion. Specifically, aircraft, e.g., Navy aircraft, are exposed to seawater spray in addition to various acid-forming gases such as sulfur dioxide, carbon dioxide, etc. Moreover, in addition to aircraft, various machinery and equipment in the industrial environments, where fossil fuels are used, need protection against corrosion. It is important therefore that the coatings be resistant to various chemicals and the weather and also be flexible and have good adhesion characteristics.

Presently, coating systems are comprised of one or more films, i.e., an undercoat, a sealant and a topcoat. Aircraft, for example, traditionally have been coated with high performance two-component protective films consisting of an epoxy primer and a polyurethane topcoat. The epoxy primers used on the aircraft are designed to adhere to the metal surface and improve the adhesion of the topcoat and prevent corrosion. However, the primer coat requires a topcoat, since it lacks flexibility especially at low temperatures ($-60°$ F.) which results in extensive cracking in highly flexed areas of the aircraft. The primer also lacks weather resistance and cannot generally be formulated in various colors required for aircraft. Thus, the polyurethane compositions of this invention provides not only adhesion and corrosion resistance, but also have the required degree of flexibility, the desired optical properties, and the resistance to weather and operational chemicals. Moreover, the multi-film coatings utilized heretofore generally have a total dry film thickness ranging up to about 0.005 inches, e.g., up to about 5 mils or more which adds considerable weight to the aircraft. Further, it is time consuming to apply two coats particularly since there is a drying time requirement between each application. The removal of a two-coat system also can be difficult and time consuming and these coatings generate high levels of volatile organic (VOC) emissions during the coating operations.

In accordance with this invention, however, the corrosion resistant coating comprises a polyurethane binder derived from the reaction of at least one polyol and an aliphatic polyisocyanate based on hexamethylene diisocyanate (HDI) in combination with a unique combination of corrosion-inhibiting pigments consisting essentially of an alkaline earth metal or zinc phosphate particularly a zinc-barium phosphate, zinc salts of benzoic acids or substituted benzoic acids, and calcium borosilicate. All three of these salts are essential, in the stated relative proportions, to provide a high gloss film with the necessary corrosion resistance, and adhesion required of a good coating. Other pigments and particularly titanium dioxide ($TiO_2$) including spherical $TiO_2$ particles e.g. vesiculated beads may be included as a pigment together with the three salts. The coating composition of this invention may be applied, as one coat, directly to various hard surfaces such as metal and/or organic matrix composites etc. and does not require a topcoat or undercoat to provide a corrosion-resistant finish with desired optical properties.

SUMMARY OF THE INVENTION

A corrosion-resistant coating which can be applied directly to a surface as a self-priming topcoat comprises about 10 to 90 percent by weight of a polymeric urethane binder and 5 to 65 percent by weight of a combination of corrosion-resistant pigments consisting essentially of calcium borosilicate, zinc salts of benzoic acids, and alkaline earth metal or zinc phosphates such as zinc-barium phosphates, solvents and a $TiO_2$ pigment.

Accordingly, it is the object of this invention to provide a corrosion resistant coating which can be applied directly to a surface e.g., metal, as a single coat.

It is another object of this invention to provide a coating which is flexible, resistant to chemicals, and weathering, and also has good adhesion to the substrate.

It is still a further object of this invention to provide a coating for use on military or civilian aircraft of substantially reduced thickness to reduce the weight added to the aircraft while at the same time providing the necessary corrosion resistance.

These and other objects of the invention are accomplished, in accordance with this invention, by providing a corrosion-resistant composition capable of being applied as a single topcoat with high gloss and corrosion resistance properties.

THE PREFERRED EMBODIMENT

This invention is directed to a corrosion resistant coating which functions as a primer and as a topcoat. The coating has good adhesion characteristics, is highly flexible and resistant to chemical and extreme weather conditions.

More specifically, this invention relates to a corrosion-resistant coating which comprises from about 10 to 90 percent or 30 to 60 percent by weight of the total coating of an organic polymeric binder i.e., a polyurethane binder, and about 5.0 to 65 percent by weight of the total weight of the coating of a combination of pigments i.e. metal salts. The combination of pigments consist essentially of from about 15 to 35 percent or 20 to 30 percent by weight of an alkaline earth metal or zinc phosphate e.g. zinc-barium phosphate, 1 to 5 percent or 2 to 4 percent by weight of a zinc salt of a benzoic acid or a substituted benzoic acid, and about 5 to 35 percent or 10 to 30 percent by weight of calcium borosilicate. In addition, depending on the opacity etc. required of the coating, from 0 to 30 percent e.g. from 1 to 20 percent by weight of a titanium dioxide pigment based on the total weight of the coating may be added as an additional pigment. Generally, the coating is applied as a solution and therefore comprises about 0 to 75 percent, e.g. from 5 to 75 percent or 5 to 50 percent by weight of the total coating of at least one organic solvent e.g. Mil-T-81772 including various mixtures of solvents such as paint solvents.

In the preferred embodiment, the organic binder comprises a polyurethane, and more particulary an aliphatic polyurethane derived from the reaction of a polyol and a multi-functional aliphatic polyisocyante. The polyol is preferably used as a solution in an organic solvent e.g. toluene, xylene, n-butyl acetate, propylene glycol monomethyl ether acetate, ethyl proprionate, methyl ethyl ketone, etc. The polyisocyanate is used as a 100% solids solution but can be diluted with the above organic solvents. The hydroxyl number of the polyol, i.e. polyester polyols and the isocyanate (NCO) content or the equivalent weight of the isocyanate and polyol are determined to obtain the desired urethane. The preferred polyols and isocyanates are reacted in approximately stoichiometric amounts such that the NCO to OH ratio ranges from about 0.85 to 1.4 equivalent of the NCO to 1.0 equivalent of the OH e.g. about 1 0 to 1.0 ratio of the NCO to OH.

The combination of metal salts and/or pigments is unique and consists essentially of an alkaline earth metal phosphate e.g. zinc phosphate or zinc-barium phosphate etc., zinc salts of benzoic acid or a substituted benzoic acid and calcium borosilicate in controlled ratios. These three metal salts or pigments alone or in combination with other pigments e.g. TiO$_2$ provide outstanding corrosion protection, which enables the coating to be used as a single, self-primary high-gloss or low-gloss topcoat. The preferred zinc salts of the benzoic acids have at least one hydroxyl substituent and one (NO$_2$) group. The zinc salts of the benzoic acids are further characterized as having molecular weights of approximately 100 to 500 and a density of about 2–3 grams per milliliter. The preferred zinc phosphates i.e. zinc-barium phosphate are available as Phos-Plus (J0866) from Mineral Pigments Corporation. The calcium borosilicates are available from Halox Pigments as CW-291. In addition to utilizing the combination of pigments or salts in the required ratios, other known pigments particularly titanium dioxide may be added to the binder to provide reinforcing strength and also to add color, hiding and opacity to the coating. Other additives that maybe used include tinting or coloring agents which may be added to the coating in small but effective amounts such as zinc oxide, antimony oxides, barium sulfate, calcium carbonate and one or more of the organic pigments such as the phthalocyanine colors e.g. greens or blues, etc.

Specifically, the corrosion resistant coatings of this invention can be prepared by glass shot-milling the ingredients set forth in the following Examples.

TABLE I

| Polyurethane self-priming topcoats are prepared as follows: | | | | |
|---|---|---|---|---|
| | Percents by Weight | | | |
| Ingredient | A | B | C | D |
| 1. Polyester polyol blend | 28.1 | 38.4 | 23.6 | 29.4 |
| 2. Titanium dioxide | 10.8 | 1.3 | 15.7 | 14.7 |
| 3. Titanium dioxide vesiculated beads | 0.6 | 1.1 | 0.5 | 1.5 |
| 4. Zinc-barium phosphate | 26.0 | 25.1 | 24.3 | 24.5 |
| 5. Zinc salt of a substituted benzoic acid (Sicorin RZ) | 2.6 | 2.5 | 2.4 | 2.4 |
| 6. Calcium borosilicate | 18.5 | 13.2 | 22.2 | 13.5 |

TABLE I-continued

| Polyurethane self-priming topcoats are prepared as follows: | | | | |
|---|---|---|---|---|
| | Percents by Weight | | | |
| Ingredient | A | B | C | D |
| 7. Aliphatic polyisocyanate (DESMODUR N-3200) | 13.4 | 18.4 | 11.3 | 14.0 |
| 8. Wetting Agent (Anti-Terra-204) | 0.1 | 0.1 | 0.1 | 0.1 |

Note
Mix ingredients 1 through 6 and then mill to a Hegman grind ≧ 5 for camouflage or ≧ 7 for high gloss (ASTM D 1210 procedure). Add ingredient 7. Apply self-priming topcoat to substrate while it is still liquified.

In the specific examples, the polyester polyol blend was used as a 79% solids solution in propylene glycol monomethyl ether acetate and n-butyl acetate and the aliphatic polyisocyanate was a 100% solids i.e. it contained no solvents.

Preferably, the coatings are prepared by mixing all of the ingredients, except the polyisocyanate and milling the mixture to a fineness of grind of about 5 for comouflage and 7 for high gloss colors on the Hegman scale according to ASTM D1210. Subsequently, the polyisocyanate is added before application of the coating which is applied on the substrate at thickness ranging from about 0.001 to 0.003 inches e.g. up to about 10 mils preferably 1 to 3 mils. The coating may be applied by various methods including spraying, rolling, or brushing onto the surface depending on the viscosity of the coating. The viscosity of the coating for the particular application may be achieved by adjusting the content of the solvent within the ranges specified herein and the selection of the particular urethane. After the coating is applied to the surface, the solvent is evaporated at room or elevated temperatures and the coating cures to a film having the desired properties. The pigments can be introduced into the coating by first forming a mill base with the polyester polyol. The mill base can be formed, for example, by conventional sand-grinding or ball-milling techniques, and then blended, by simple stirring or agitation, with the other constituents of the composition.

It was unexpected to find that the specific combination of calcium borosilicate, zinc salts of benzoic acid, e.g. zinc benzoate and alkaline earth metal phosphates e.g. zinc or zinc-barium phosphates, synergistically, improved the corrosion resistance of the coating. In other words, the specific combination of calcium borosilicate, zinc salts of substituted benzoic acid and zinc or zinc-barium phosphates, in the percentages stated, improved the corrosion inhibition of the coating substantially when compared to the use of either one of these metal salts alone.

More specifically, the preferred polyester polyols (e.g. mixture of DESMOPHEN 670A-80 and XP-631) of this invention have equivalent weights ranging from about 260 to 970 with hydroxyl numbers ranging from 40 to 252 and an acid number less than 10. The polyols includes a variety of polyester polyhydroxyl compounds known in the art including, for example, the condensation-reaction products of pentaerythritol and/or glycols with monocarboxylic acids or an aromatic or aliphatic dicarboxylic acid. Any branched-chain glycol maybe used in the formation of the polyester, although it is preferred that these glycols contain no more than 8 carbon atoms. A useful polyol is formed where the molar ratio of glycol to pentaerythritol is from 2:1 to about 6:1. The monocarboxylic acid component of the polyester polyol prevents the molecular weight build-up of the polyol. It has been found that any aromatic or aliphatic monocarboxylic acid or mixtures of these having 18 or less carbon atoms can be used. Normally, the acids will be used in a molar ratio of acid to polyalcohol of about 1:1 to 2.5:1.

Examples of aromatic monocarboxylic acids include benzoic acid, butylbenzoic acid, triethyl benzoic acid, toluic acid, phenylacetic acid, and the like. Examples of aliphatic acids are acetic acid, propionic acid, butyric acid, valeric acid, caproic acid, caprylic acid, pelargonic acid, capric acid, lauric acid, myristic acid, palmitic acid, stearic acid, etc.

The dicarboxylic acids useful in the formation of the polyester polyol have the general formula:

where R is aliphatic or aromatic group. Preferred are succinic acid, glutaric acid, adipic acid and pimelic acid. Useful acids are those in which R has 2 to 8 carbon atoms with the preferred being maleic acid and itaconic acid. The aromatic dibasic acids are phthalic, isophthalic, and terephthalic, although other aromatic dibasic acids can be used.

It is understood that the lower alkyl mono- or diesters of these acids and the anhydrides of these acids can be used in place of the acids. Other known polyester polyols can be obtained by the condensation reaction between a polybasic acid, such as adipic acid, phthalic anhydride, isophthalic acid, etc., and a diol or triol, such as ethylene glycol, diethylene glycol, propylene glycol, trimethylol propane, glycerine, etc. Polyether polyols can be prepared by adding propylene oxide, ethylene oxide, or the like, to a polyhydric alcohol, such as glycerine, propylene glycol, etc.

The hydroxyl numbers of the preferred polyester polyols should be at least 40 and preferably between 40 and 252. The polyester, containing hydroxyl groups, is combined with the aliphatic polyisocyanate. This combination can be carried out in several ways known to the art. For example, to an organic solution of the polyester containing, if desired, a catalyst promoting urethane formation such as an organo-tin compound, an equivalent amount of the isocyanate is added. The combination is made at ambient temperature and the heat of reaction usually causes an increase in temperature. The mixture is agitated preferably at room temperature until the urethane reaction has been substantially completed. The course of the reaction can be followed by noting the viscosity of the mixture. When the viscosity becomes substantially constant, it may be concluded that the reaction has been substantially completed. The resultant reaction product contains insignificant amounts of free isocyanate and/or hydroxyl groups.

Alternatively, the polyester solution can be reacted with a small excess, e.g. about 10% excess of the equivalent amount, of the isocyanate. After the urethane reaction has been substantially completed, the excess NCO groups can be reacted with "chain-extending" substances, e.g. water, alcohols, etc. This procedure results in polymers of substantially equivalent character and permits the reaction to proceed at a faster rate, due to the mass action of the excess NCO groups. The term "small excess amounts" is intended to be included within the meaning of the term "stoichiometric amounts".

The polyisocyanates and particularly polyisocyanates based on HDI are used as an organic solution and include various multi-functional aliphatic polyisocyanates having an isocyanate content (NCO) ranging from about 10 to 30% by weight of the compound, and an equivalent weight (NCO) ranging from about 100 to 300. Specific examples of the organic polyisocyanates used in the present invention make up 5 to 30% and preferably 10 to 25% by weight of the film-forming blend. These compounds include aliphatic, cycloaliphatic, alkaryl, aralkyl, heterocyclic, and aryl di- or triisocyanates. Specific compounds include for example, polyisocyanates that are based on:
diphenylmethane-4,4'-diisocyanate,
diphenylene-4,4'-diisocyanate
toluene-2,4-diisocyanate,
toluene-2,6-diisocyanate,
3,3'-dimethoxy-4,4'-diphenylene diisocyanate methylene-bis-(4-cyclohexyl isocyanate)
tetramethylene diisocyanate,
hexamethylene diisocyanate,
decamethylene diisocyanate,
ethylene diisocyanate,
ethylidene diisocyanate,
propylene-1,2-diisocyanate,
cyclohexylene-1,2-diisocyanate,
m-phenylene diisocyanate,
p-phenylene diisocyanate, 1,5-naphthalene diisocyanate,
3,3'-dimethyl-4,4'-biphenylene diisocyanate,
3,3'-dimethoxy-4-4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
furfurylidene diisocyanate,
bis-(2-isocyanatoethyl)fumarate,
1,3,5-benzene triisocyanate,
para, para', para"-triphenylmethane triisocyanate,
3,3'-diisocyanatodipropyl ether,
xylylene diisocyanate,
B,B-diphenyl propane-4,4'-diisocyanate, and
isophorone diisocyanate.

Preferred polyisocyanate compounds are based on hexamethylene diisocyanate and methylene-bis-(4-cyclohexyl isocyanate) e.g. DESMODUR-N.

By selecting the proper polyols and by adjusting the NCO to OH ratio, the physical properties and efficiency of the film, such as the strength of film, flexibility, chemical resistance, solvent resistance, etc., can be controlled over a wide range. Compounds where the NCO to OH ratio ranges from 0.85 to 1.4 of NCO to 1.0 of OH groups e.g. 1.2:1 are suited for the manufacture of coating in accordance with this invention.

In a two package system, a solution of polyisocyanate is in one package, and a solution of the polyol is in a separate package. The two solutions are thoroughly mixed just before applying the coating composition. Separation of the two solutions is usually necessary since the "pot life" of some of the compositions is short. The polyisocyanate (NCO) reacts with the hydroxyl groups of the polyol at temperature as low as room temperature. Regardless of the method by which the coating composition is prepared, the coating should contain 10 to 90% by weight of the polyurethane binder and up to about 75% e.g. 5-50% by weight of solvent. The solvent of the composition can be a mixture of organic solvents wherein the reaction constituents of the binder react.

Instead of the two-component or "two-package" system, a "one package" coating can be prepared if the reactive groups of the polyisocyanate are blocked with a blocking agent such a methylethyl ketoxime. This eliminates the need for keeping the polyol apart from the polyisocyanate until just before use. When the coating, with the blocked polyisocyanate, is applied and heated the blocking agent is released, permitting the polyisocyanate to react with the polyester polyol.

The blocking agents are used for purposes of masking the free isocyanate radical of the polyisocyanates. These agents include phenol, m-nitrophenol, p-chlorophenol, ethyl malonate, acetylacetone, ethyl acetoacetate, cresol, methanol, ethanol, ethylene, chlorophydrin, etc. Although the temperatures at which the above-mentioned blocking agents are dissociated varies with the agents, it is generally accepted that heating is required to deblock.

The coating composition can optionally contain ultraviolet light stabilizers, antioxidants, catalysts, wetting and dispersing agents e.g. Anti-Terra-204 (carboxylic acid salts of polyamine amides), flow modifiers e.g. BYK-320 (polyether modified methylalkyl polysiloxane copolymer), adhesion promoters, etc. The ultraviolet light stabilizer can be present in an amount of 1-10% by weight, based on the weight of the binder. The antioxidant can be present in an amount of 0.1-3% by weight, based on the weight of the binder. Ultraviolet light stabilizers include benzophenones, triazoles, triazines, benzoates, substituted benzenes, organophosphorous sulfides, etc. Particularly useful are the hindered amines and other compounds disclosed in U.S. Pat. No. 4,061,616.

The coating composition of this invention may contain about 0.01-2.0% by weight, based on the weight of the polymer forming blend, of a curing catalyst. The catalysts are usually organo metallics such as dibutyl tin dilaurate and zinc octoate, dibutyl tin di-2-ethylhexoate, stannous octoate, stannous oleate, zinc naphthenate, vanadium acetyl acetonate, and zirconium acetyl acetonate. Also useful as catalysts are tertiary amines, such as, for example, triethylene diamine, triethylamine, pyridine, dimethylaniline, and methyl morpholine. When a two-component system is used, the catalyst can be added to either the polyisocyanate solution or the solution of the polyester polyol.

The coating composition of this invention can be applied to a variety of substrates by conventional application methods such a spraying, dipping, brushing, or flow coating. Substrates that can be coated with the composition are, for example, metal, wood, glass, or plastics such as polypropylene, polystyrene, and the like. The coating is particularly suited for application over pretreated or unprimed metal. The coating can be cured at ambient temperatures or heated at 40°-120° C. for up to an hour or more. If the coating contains a blocked polyisocyanate, temperatures ranging up to about 160° C. may be necessary.

The hydrocarbon solvent may include a mixture of solvents e.g. benzene, toluene, xylene, and aromatic naphtha. Ester solvents include ethyl acetate, butyl acetate, cellosolve, hexyl acetate, amyl acetate, ethyl proprionate, butyl proprionate, etc. Ketone solvents include acetone, methyl ethyl ketone, methyl isopropyl ketone, methyl isobutyl ketone, diethyl ketone, and cyclohexanone. Glycol ester solvents include ethylene glycol, monoethyl ether acetate, etc.

The particular alkaline earth metal or zinc phosphates used in preparing the coating composition has an average particle size of about 7.0 microns and is preferably a zinc-barium phosphate. The zinc salt of benzoic acid is specifically characterized as having at least one hydroxyl group and nitro ($NO_2$) substituent with moleculars weight of about 100-500 e.g. 300, a density of about 2-3 grams per mililiter and a specific surface area of $16M^2$/gram. The benzoic acid salt is a commercial product obtained from BASF and identified as Sicorin-RZ. The calcium borosilicate is a white, non-refractive pigment with an average particle size of 3.4 microns.

In testing the coatings prepared in accordance with this invention, the corrosion protection for an aluminum substrate was found to be over 2000 hours in 5% salt spray in accordance with ASTM Test Method B-117 and over 500 hours in $SO_2$/salt spray in accordance with ASTM Test Method G-85. The coating was found to have outstanding performance when exposed to extreme heat conditions, high intensity of light and water, extreme cold conditions, hot lubricating oils and other chemicals normally found in aircraft operations. By utilizing the coating composition of this invention, a corrosion resistant film can be obtained on various substrates. The coating therefore has properties which function as a primer and more important as a single top coat which is highly adherent, flexible, chemical resistant and resistant to all weather conditions. The coatings of this invention lower the risk of failure due to cracking especially at low temperatures and are easily touched-up since only one coating need be applied. Since the coating requires only one coat, it requires less time for application and removal and thereby saves on manpower that would generally be needed in the preparation of a two coat system. Moreover, the present coating provides protection at lower film thicknesses thereby reducing the weight of the coating compared to a two-coat paint system which is an important factor when considering aircraft coatings.

It is obvious that there are other variations and modifications which can be made with respect to this invention without departing from the spirit and scope of the invention as particularly set forth in the appendant claims.

The invention claimed:

1. A corrosion-resistant self-priming topcoat comprising from about 10 to 90 percent by weight of a polyurethane binder, 5 to 65 percent by weight of a combination of corrosion-inhibiting pigments consisting essentially of about 15 to 35 percent by weight of an alkaline earth metal phosphate, about 1 to 5 percent by weight of a zinc benzoate, about 5 to 35 percent by weight of calcium borosilicate, about 0 to 30 percent by weight of titanium dioxide, and 0 to 75 percent by weight of at least one organic solvent.

2. The coating of claim 1 wherein the polyurethane ranges from about 30 to 60 percent by weight, titanium dioxide ranges from about 1 to 20 percent by weight, alkaline earth metal phosphate ranges from about 20 to 30 percent by weight, zinc benzoate ranges from about 2 to 4 percent by weight, calcium borosilicate ranges from about 10 to 30 percent by weight and the solvent ranges from about 5 to 50 percent by weight.

3. The coating of claim 1 wherein 0 to 90 percent by weight of the total amount of titanium dioxide is in the form of vesiculated beads.

4. The coating of claim 2 wherein 0 to 90 percent by weight of the total amount of titanium dioxide is in the form of vesiculated beads.

5. The coating of claim 1 wherein the zinc benzoate is a salt of a substituted benzoic acid having one hydroxyl group and one nitro group.

6. The coating of claim 1 wherein the polyurethane is derived from an isocyanate and an aliphatic polyester polyol wherein the NCO to OH group ratios range from 0.85-1.4 to 1.0.

7. The coating of claim 6 wherein the polyurethane is derived from an aliphatic polyester polyol and an aliphatic polyisocyanate based on hexamethylene diisocyanate.

8. The coating of the claim 7 wherein the OH to NCO ratio of the aliphatic polyester polyol and the hexamethylene diisocyanate is about 1 to 1.2.

9. The coating of claim 8 wherein the zinc salt of the benzoic acid has one hydroxyl and one nitro ($NO_2$) group.

10. The coating of claim 1 wherein the aliphatic polyester polyol and the aliphatic polyisocyanate are reacted at a NCO to OH ratio of about 1 to 1.2.

11. The coating of claim 1 wherein the metal phosphate is a zinc-barium phosphate.

12. The coating of claim 1 wherein the metal phosphate is zinc phosphate.

13. A process of preparing a corrosion-resistant self-priming urethane topcoat on a metal substrate which comprises forming the polyurethane coating by applying onto the substrate an organic solution comprising from about 10 to 90 percent by weight of a polyurethane binder, 5 to 65 percent by weight of a combination of corrosion-inhibiting pigments consisting essentially of about 15 to 35 percent by weight of an alkaline-earth metal phosphate, about 1 to 5 percent by weight of a zinc benzoate, about 5 to 35 percent by weight of calcium borosilicate, about 0 to 30 percent by weight of a titanium dioxide pigment, and 0 to 75 percent by weight of at least one organic solvent.

14. The process of claim 13 wherein the metal phosphate is a zinc-barium phosphate.

15. The process of claim 13 wherein the metal phosphate is zinc phosphate.

16. The process of claim 13 wherein the solvent ranges from 10 to 50 percent by weight of the coating.

* * * * *